O. B. RAMP.
MOTOR.
APPLICATION FILED FEB. 7, 1910.
992,985.
Patented May 23, 1911.
2 SHEETS—SHEET 2.
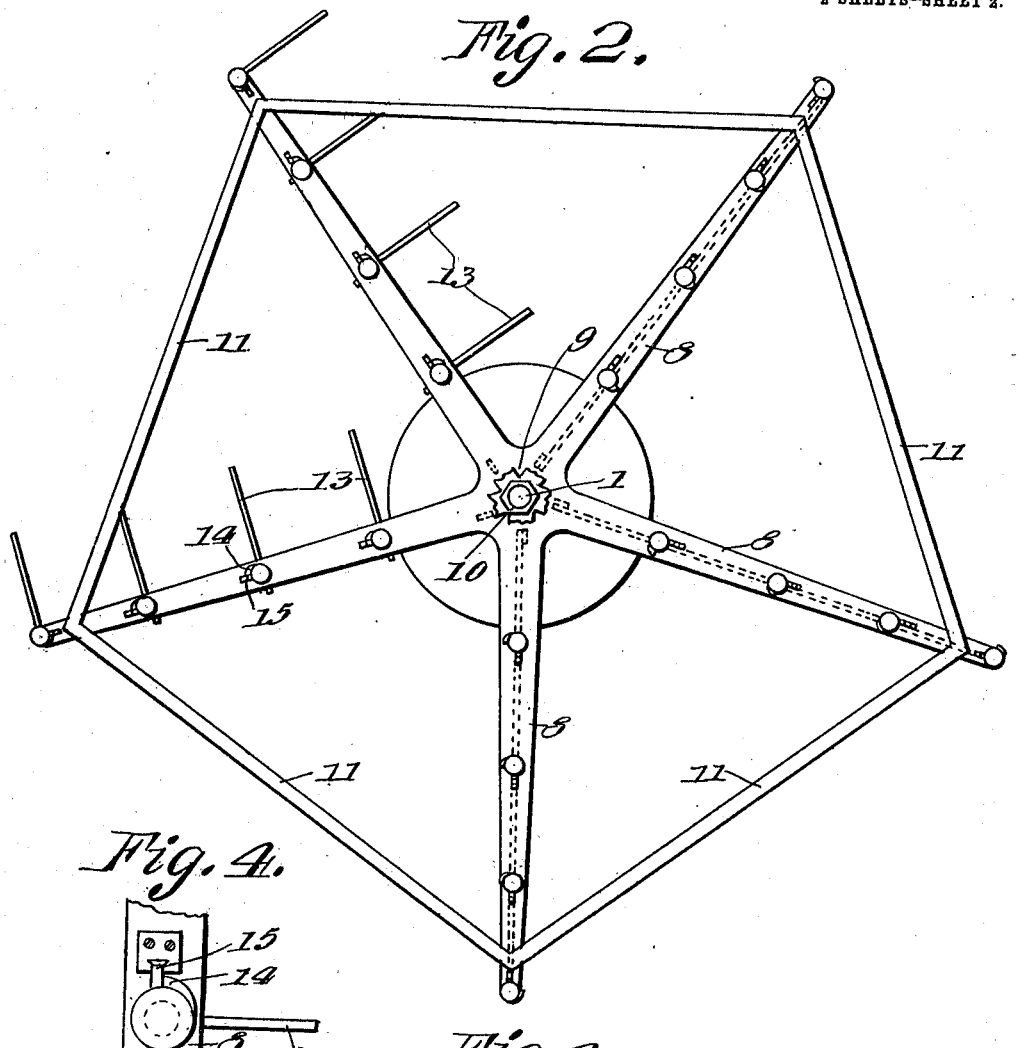
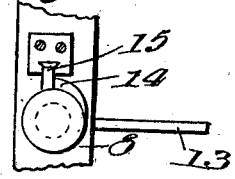
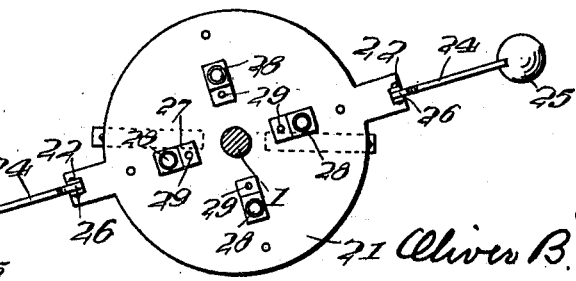
Witnesses
Inventor
Oliver B. Ramp
By E. H. Bond
Attorney

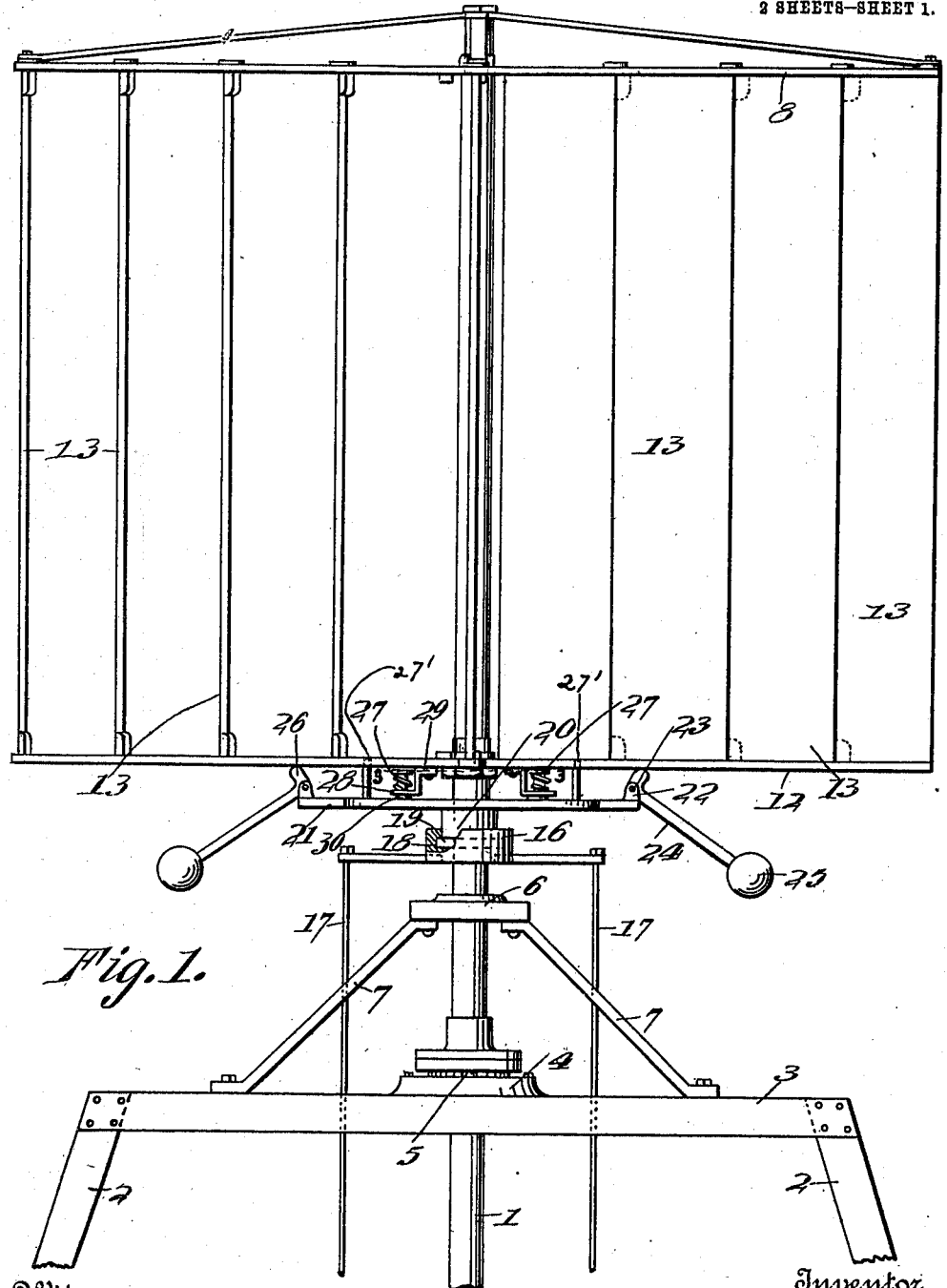

UNITED STATES PATENT OFFICE.

OLIVER B. RAMP, OF DAVENPORT, IOWA.

MOTOR.

992,985.

Specification of Letters Patent.  Patented May 23, 1911.

Application filed February 7, 1910. Serial No. 542,428.

*To all whom it may concern:*

Be it known that I, OLIVER B. RAMP, a citizen of the United States of America, and a resident of Davenport, in the county of Scott and State of Iowa, have invented certain new and useful Improvements in Motors, of which the following is a specification.

This invention relates to certain new and useful improvements in motors and more particularly to a motor adapted for current or for windmill power, and other purposes.

The present invention has for its objects, in addition to those usually sought in devices of this kind, to provide an improved construction whereby the blades, which may be of any desired number and size according to the use and circumstances, are mounted so as to allow the fans or fan blades to make only a quarter swing on their return. When used for windmill purposes I provide an improved form of governor and means whereby positive control is at all times provided.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is an elevation showing my present improvements as applied to a windmill. Fig. 2 is a top plan as embodied in a current motor. Fig. 3 is a horizontal section on the line 3—3 of Fig. 1, looking down and with parts removed. Fig. 4 is a detail in enlarged view showing the stop for allowing only a quarter turn of the fan blades on the return.

Like numerals of reference indicate like parts in the several views.

Referring to the drawings, Fig. 1, wherein the device is shown as applied to a windmill, 1 designates the shaft mounted in suitable bearings in the support 2, which latter may be of any of the well-known forms of construction, upon the upper member 3 of which is the bearing 4, preferably a ball bearing, as seen at 5, it being understood that the shaft 1 is the main shaft to the gearing, not herein illustrated. 6 is another bearing for the shaft 1 supported above the member 3 and braced by suitable braces 7, as seen clearly in Fig. 1.

8 are arms, four in number, extending radially from the hub or the like 9, through which passes the shaft 1 which may be provided with a retaining nut or the like. 12 are similar arms projecting from the hub or head at a point below the arms 8, at a distance therefrom depending upon the required height of the fans or blades. These blades 13 are suitably mounted on pintles or the like in the arms 8 and 12, as shown, being adapted to extend in a plane parallel with the said arms, as seen in dotted lines in Fig. 2, or, upon the return, to assume a position at an angle of substantially 90° with relation thereto, as indicated by full lines in said Fig. 2. In order to prevent the fans or blades from making more than a quarter swing on the return, each fan or blade is provided with a stop lug 14, adjacent its pintle and adapted to engage a stop 15 secured in any suitable manner to the adjacent arm in which the blade is pivoted. This will be clearly understood upon reference to the detail, Fig. 4.

16 is a block or disk movably mounted on the shaft 1 and to which are connected the control rods 17 which extend downward and are adapted to be manipulated in any suitable manner. This block has an annular recess 18 in which is engaged an annular collar or flange 19 on the depending hub 20 which carries the plate 21, which plate is provided with lugs or ears 22 in which are pivotally mounted, as at 23, the arms 24, the longer ends of which carry the weights 25 and the shorter arms 26 of which extend at substantially a right angle to the length of the longer arms, as seen in Fig. 1. These arms 24 serve as governor arms. The inner blades of each radial series are designed to be held by the locking pins 27' and the successive blades of each series by overlapping each upon the next so that when the plate 21 and with it all the locking pins are drawn down, all of the blades will be released. In order that the same result may be obtained automatically, the governor arms 24, when their weighted ends become horizontal under excessive speed, cause their cam ends 26 pressing upon the arms 12 to force the plate 21 downward and thus release all of the blades, withdrawing the pins 27' from the openings in the arms.

27 are springs interposed between the plate 21 and the arms 12, in this instance being shown as having a bearing at their lower ends upon a horizontal member 28 of a bracket 29 secured to the under side of the arms 12 and being guided by a vertical pin or the like 30 secured to the plate 21 and extending upward through the horizontal member 28 of the bracket and through the spring.

In order to stop the motor and the mill, the control rods are pulled down upon and locked in any suitable manner. This forces the plate 21 and springs upward and locks the device against operation.

When employed as a current motor, instead of four arms, as in windmill use, I employ five or more, such number being shown in Fig. 2, the construction and disposition of the blades being the same as before described, the arms 8 being preferably braced near their outer ends by braces as 11.

Modifications in detail may be resorted to without departing from the spirit of the invention or sacrificing any of its advantages. The number of arms or wings may be varied, preferably four wings or arms extending radially being employed for the windmill purposes and a greater number when employed as a current motor.

When employed as a current motor, it is to be understood that the device is placed within the stream or current at the proper depth, so as to get the full benefit of the flow of the water thereagainst.

The motor when employed for windmill purposes will preferably be formed of thin steel braced from the center tip to the extremity, as seen in Fig. 1.

By the particular construction and arrangement of the parts as shown in Fig. 2, additional pressure is gained, there being a radial pull gained by the position of the blades and lost motion by a swing and return is avoided. The quarter swing of the fan blades coöperating with the tips of the overlapping portions provides a construction that is light, yet strong, and which produces the best results.

The fan blades being free of each other in action gives greater accuracy in taking the force of the current on the swing, the blades at the extremity beginning to close first, then the others in succession, as will be readily understood.

What is claimed as new is:—

1. In a device of the character set forth, a motor comprising pivotally mounted blades, upper and lower arms therefor in which the pivots of the blades are supported, stops projecting from and carried by the blades, a coöperating member on the supports of the blades to allow not greater than a quarter circle swing of the blades, and means engageable with the under sides of the lower arms for simultaneously releasing all of the blades, embodying a member movable in the direction of the length of the blades and pivotally mounted governor arms carried by said member and having cam portions and weighted ends, said cam portions being engageable with the under sides of the lower arms.

2. In a device of the character set forth, a motor comprising pivotally mounted blades, upper and lower arms in which said blades are pivoted, stops projecting from and carried by said blades, coöperating members on said upper and lower arms to allow not greater than a quarter circle swing of the blades, a vertically movable plate, pins thereon for engagement with openings in the lower arms of the motor, pivoted weighted cam means having their cam portions engageable with the under sides of the lower arms for simultaneously disengaging said pins from their openings in the arms, thereby releasing all of said blades.

3. In a device of the character set forth, a motor comprising pivotally mounted blades, upper and lower arms in which said blades are pivoted, the lower arms having perforations, stops projecting from and carried by the blades, coöperating members on said upper and lower arms to allow not greater than a quarter circle swing of the blades, a vertically movable plate, springs supporting the plate, blade locking pins thereon working in the perforations in the lower arms, and means for simultaneously releasing all of said blades embodying pivotally mounted governor arms on said plate, each having a centrifugal weight on one end and the other end formed as a cam to engage the under side of the lower arm to depress the plate, withdraw the pins, and release the blades.

4. In a device of the character set forth, a motor with blades, its shaft, a plate movably mounted on the shaft with relation to the motor, a disk connected with said plate and movably mounted on said shaft and having control rods attached thereto, brackets on the motor, springs carried by the brackets and interposed between the plate and motor, locking means on the plate engaging the lower arms of the motor, and centrifugal means pivoted on said plate and having cam portions engageable with said lower arms to depress the plate.

5. In a device of the character set forth, a motor with blades, its shaft, a plate movably mounted on the shaft with relation to the motor, a disk connected with said plate and movably mounted on said shaft and having control rods attached thereto, brackets on the motor, springs carried by the brackets and interposed between the plate and motor, locking means on the plate engaging the lower arms of the motor, and means pivoted on said plate and having cam portions engageable with said lower arms to depress the plate, said cam means being provided with centrifugal weights.

6. In a device of the character set forth, a shaft, radial arms thereon having blades mounted on vertical pivots in said arms in series, the successive blades of each series constructed to overlap each upon the next, a plate movable with relation to the said arms, interengaging locking means between said plate and arms, yielding means interposed between said plate and the lower arms, and weighted means pivotally mounted on said plate and having cam portions adapted to engage the under surfaces of said arms to disengage said locking means.

Signed by me at Davenport, Iowa, this 15th day of January 1910.

OLIVER B. RAMP.

Witnesses:
 RAY R. KULP,
 BESSIE G. KULP.

---

Copies of this patent may be obtained for five cents each, by addressing the "Commissioner of Patents, Washington, D. C."